United States Patent [19]
Denny et al.

[11] 3,988,514
[45] Oct. 26, 1976

[54] CATALYTIC MATERIAL

[75] Inventors: Patrick John Denny; Donald Anderson Crooks, both of Stockton-on-Tees, England

[73] Assignee: Imperial Chemical Industries Limited, London, England

[22] Filed: Nov. 21, 1973

[21] Appl. No.: 417,935

Related U.S. Application Data

[62] Division of Ser. No. 193,692, Oct. 29, 1971, abandoned.

[30] Foreign Application Priority Data
Nov. 13, 1970 United Kingdom............... 54128/70

[52] U.S. Cl.............................. 427/239; 106/48; 126/273 R; 126/19 R; 427/330; 427/376 A
[51] Int. Cl.$^2$...................... B05D 7/22; B05D 3/02
[58] Field of Search....................... 117/129, 169 R; 106/48 C; 126/19 R, 273 R; 427/239, 330, 376 A

[56] References Cited
UNITED STATES PATENTS

| | | | |
|---|---|---|---|
| 3,266,477 | 4/1964 | Stiles | 126/19 R |
| 3,549,419 | 12/1970 | Stiles | 126/19 R |
| 3,587,556 | 6/1971 | Moreland | 126/19 R |
| 3,598,650 | 8/1971 | Lee | 126/19 R |
| 3,732,857 | 5/1973 | Williamitis | 126/19 R |

FOREIGN PATENTS OR APPLICATIONS
1,197,067    7/1970    United Kingdom.................. 106/48

*Primary Examiner*—Mayer Weinblatt
*Assistant Examiner*—Edith R. Buffalow
*Attorney, Agent, or Firm*—Cushman, Darby & Cushman

[57] ABSTRACT

A self-cleaning catalytic coating for cooking oven walls comprises a mutually sintered matrix of hard catalyst particles and binder particles.

The coating is preferably made by forming large hard catalyst particles, such as compressed pellets, milling them to the required size range, typically averaging above 2 microns, then incorporating them with a binder and applying the mixture to a substrate.

9 Claims, No Drawings

CATALYTIC MATERIAL

This is a division of application Ser. No. 193,692, filed Oct. 29, 1971, now abandoned.

This invention relates to a catalytic material and in particular to a composition containing a catalyst for the oxidation of fat and suitable for surfaces liable to be fouled by fat oxidation products, such as the walls of cooking ovens.

Although the catalytic self-cleaning oven has been the subject of research for many years, and marketable ovens have been produced, there is still room for improvement in the properties of the oven wall coating, since it does not appear to be easy to make the coating strong and resistant to heat and abrasion, without at the same time decreasing its catalytic activity, and vice versa. According to published patent specifications it has been proposed to improve the behaviour of such coatings inter alia by suitable choice of catalytic oxides, by using alkali silicates as binders, or by mixing the catalytic oxides with the enamel constituents homogeneously by fusion and then solidifying and milling to give the material of the coating.

According to the invention a catalytic coating suitable for oven walls comprises a mutually sintered matrix of hard catalyst particles and binder particles.

By "hard" is meant hard enough to withstand without break-down the processes involved in applying the material to the surface. The particles are preferably porous aggregates in order to afford adequate catalytic activity, but they should be cohesive enough to resist substantial covering of the particles by the binder. The catalyst particles can be larger or smaller than the binder particles. Preferably they are on average, and especially to the extent of at least 70 percent, at or above 2 microns in diameter, suitably with at least 30 percent at or above 8 microns, and more preferably with at least 60 percent at or above 25 microns. The upper limit is set by the intended thickness of the coating and is typically about 250 microns, for example up to 100 microns, unless the application of the coating involves removal of excess thickness by grinding or buffing.

The porosity of the coating as a whole is preferably in the range 10–40v/v, but lower or higher values of porosity are suitable for some types of use.

The catalyst comprises most conveniently oxide or metal, depending on which is the more stable in the conditions encountered in making the particles, in applying them to the oven wall in a coating and in using the oven with wall surfaces thus covered.

The metal of the oxide or the metal of the catalyst is suitably copper, vanadium, bismuth, molybdenum, manganese, iron, nickel, platinum-group metals, tin, niobium, chromium, tungsten, rhenium, cobalt or cerium or a mixture or compound of two or more of these. Especially active coatings are obtained if there is present an oxide of copper, manganese or cobalt, particularly when copper or manganese is present along with at least one other oxide from the above list. Very suitably copper and manganese are both present and together form the preponderant proportion (by weight calculated as monoxide) of the catalytic material present. The proportion of metal or oxide in the coating is preferably at least 5 percent and suitably in the range 10–40 percent.

The particles of catalyst may consist entirely of active material if the material used is such that it can be formed into individually strong particles without the addition of other substances. Thus the invention includes coatings in which the particles have been formed by for example compression, granulation, compaction or spray-drying (any of these being followed, if necessary, by sintering), or fusion, followed by milling. It also includes coatings in which the strength of the particles has been increased by having present a hydraulic cement or a sinterable binding additive. It is preferred to use compounded, rather than impregnated catalyst support particles, since their whole volume is believed to contain active catalytic surfaces. The catalyst particles preferably contain at least 15 percent, especially at least 40 percent of catalytically active material. The catalyst particles can contain a minor proportion of binder, in order to facilitate adhesion between catalyst particles and binder particles. The catalyst particles are preferably of such a strength that they would, if in the form of cylinders of length between half and double their diameter, have a crushing strength as hereinafter defined in the range 1500–10,000 p.s.i.g. Their density is preferably in the range 1.4 to 2.5 g/cc as measured by mercury penetration. Their porosity is preferably in the range 10–70 percent v/v.

The binder is preferably an enamel, which itself will of course be incompletely fused in the coating. The mean diameter of the binder enamel particles is suitably about half to equal to that of the catalyst particles. The enamel is preferably of the type which becomes fluid over a comparatively long temperature range, that is, 50°–100° C for example 750°–820° C, in order to facilitate control of sintering and thus of porosity. A so-called "self-matting" enamel is very suitable. Enamel-bound coatings according to the invention typically have a Mohs-scale hardness of at least 3.0, for example 3.5 to 4.5.

The invention provides also a method of making the catalytic coating, which comprises making large catalyst particles having a strength equivalent to that of cylinders of length between half and double their diameter with a crushing strength (as hereinafter defined) of 1500–10,000 p.s.i.g; these large particles are then milled to the size range required and incorporated with the binder and applied to a substrate.

The preferred method of making such a catalytic coating comprises compressing a catalytic composition into large particles which are cylindrical pellets having a crushing strength (as hereinafter defined) of at least 1500 p.s.i.g., preferably in the range 2000 to 10,000 p.s.i.g., milling the pellets, selecting a size-fraction on average greater than 2 and preferably above 25 microns, incorporating this fraction with a sinterable binder, and applying the resulting mixture to a metal surface by sintering the binder particles sufficiently to hold the catalyst particles in position without substantial covering of the catalyst particles by the binder.

The catalyst large particles are suitably those regularly made in the catalyst industry, having length and diameter suitably in the range 2 to 25 mm. The size-distribution of the catalyst particles to be incorporated with the binder is preferably as specified hereinbefore in describing the coating.

The crushing strength as previously referred to is the force which when applied to unit area of the ends of a cylindrical pellet before crushing will just break the pellet. It is believed that the milled pellets have a strength which is correlated with their strength before milling, and that this strength enables the catalyst particles to keep their size and shape while being applied in the binder and thus to exert high catalytic activity.

The porosity of the catalyst particles is believed to be correlated with that of the large particles from which they were formed by milling. The porosity of the large particles is preferably in the range 10–70 percent, especially over 40 percent v/v. The density of the large particles is preferably in the range 1.4 to 2.5 g/cc as measured by mercury penetration.

The fusible binder is suitably a highly fluorinated organic polymer or an enamel frit, the latter being preferred on account of its greater durability and resistance to overheating.

When the binder is an enamel, certain of the catalyst/binder compositions having characteristics as herein defined, whether before or after application as a coating, are believed to be new compositions of matter.

The method of invention, as a result of the possible range of catalyst particle size which can be used, can provide "rough" or "smooth" coatings according to the requirements of users of the coated ovens; and it can be combined with a subsequent grinding or buffing treatment, which may be for the purpose of producing a relatively smooth coating from one which was initially rough as the result of using large-size catalyst particles.

EXAMPLE

Preparation of Coating a. A copper oxide/manganese oxide composition in which the atomic ratio of Cu to Mn was 30:70 was produced by co-precipitation from the nitrates by means of sodium carbonate, followed by thorough washing and calcination at 400° C for 2 hours. The resulting oxide mixture was pelleted in a die to cylindrical pellets 3.6 mm high by 5.4 mm diameter having a mercury penetration density of 1.8 g/cc, a mean vertical crushing strength of 168 pounds (equivalent to 4700 p.s.i.g.) and a porosity of 57 percent. The pellets were milled to pass a 100 mesh sieve but to be held to the extent of 25 percent by a 200 mesh sieve (i.e. size range up to 152 microns) and mean diameter 35–40 microns. Then 10 g of this powder were mixed with 61.5 g of vitreous enamel aqueous slip containing 40 g of frit. (The frit used had been ground such that 94 percent of it passed a 200 mesh sieve, i.e. particle size mainly under 76 microns). The slip contained clay and electrolytes as are usual in enamelling. After adjustment of fluidity by adding water this slip was flow-coated on to a 7.5 × 7.5 cm. square sheet of mild steel groundcoated with enamel, so as to give a final thickness, after firing, of 0.025 cm. The slip coating was allowed to dry and was sintered by heating at 775° C for 3 minutes. The porosity of the coating, as determined by water-uptake, was 26 percent. The hardness of the coating was 3.5 to 4.0 on Mohs' scale. This is to be compared with only 2.5 for a coating ($a'$) of similar composition but made from unpelleted oxide mixture.

(b) A test sample similar to (a) but containing the oxides of Cu, Co and Mn in the atomic ratio 20:20:60 was made by spray-coating. Its porosity was 24 percent and its hardness 4.0 to 4.5 on Mohs' scale, compared with 1.0 to 1.5 for a corresponding coating ($b'$) made using unpelleted oxide mixture.

For each of the above coatings the enamel frit used was supplied by Radiation Ltd. and as described in U.S. Pat. No. 3,939,295. This was a self-matting enamel frit having the weight percentage composition:

| | |
|---|---|
| $SiO_2$ | 44 |
| $Al_2O_3$ | 2.8 |
| $Na_2O$ | 14.8 |
| $K_2O$ | 1.1 |
| $ZnO$ | 9.8 |
| $CaO$ | 26.1 |
| $B_2O_3$ | 1.4 |

Test of Catalytic Activity

Each coated sheet was tested by weighing, applying successive drops of molten lard (approx. 14.5 mg. each) and then heating for 275° C in air for 3 hours, whereafter the sheet was weighed again. The Table shows the number of drops applied, the weight of applied fat and of residue and the percentage of the applied fat which remained as residue.

TABLE

| Drop number | Residue, $g \times 10^4$ | |
|---|---|---|
| | Coating (a) | Coating (b) |
| 1 | 8 | 5 |
| 2 | 14 | 9 |
| 3 | 17 | 11 |
| 4 | 21 | 14 |
| 5 | 25 | 17 |
| 6 | 30 | 20 |
| 7 | 38 | 20 |
| 8 | 45 | 20 |
| 9 | 51 | 21 |
| 10 | 57 | 21 |
| 11 | 56 | 28 |
| % residue after drop 11 | 3.5 | 1.8 |
| Total applied fat, $g \times 10^4$ | 1600 | 1500 |

It is evident that both coatings effectively caused removal of the fat first applied and permitted only a small residue to accumulate, coating (b) being better in both respects than (a).

c. A coating similar to (b) but using crushed catalyst having a mean particle size of 8 microns was found to be equally resistant to build-up of fat residues. Its hardness was 3.5 to 4.0 on Mohs' scale.

We claim:

1. In a method for making an oven surface comprising a substrate and a catalytic coating consisting essentially of:

a mutually sintered matrix of:

a. hard particles of a catalyst for the oxidation of fat composed of at least one member of the group consisting of a metal selected from the group consisting of copper, vanadium, bismuth, molybdenum, manganese, iron, nickel, platinum-group metals tin, niobium, chromium, tungsten, phenium, cobalt and cerium, oxides of said metals, and compounds of two or more of said metals and oxides, and b. enamel binder particles such that the enamel bound coating has a Mohs hardness of at least 3.0, said hard catalyst particles being strong enough to prevent breakdown during the formation of the coating, said method comprising:

forming said catalyst for the oxidation of fat into catalyst particles, mixing the catalyst particles with the enamel binder to form a mixture, applying the mixture as a coating to the substrate, and firing the coating, the improvement wherein said hard particles of said catalyst are made by first making large hard catalyst particles having a strength equivalent to that of cylinders of length between half and double their diameters with a crushing strength of 1500–10,000 p.s.i.g. and then milling the large hard catalyst particles.

2. A method according to claim 1 in which said catalyst particles after milling are to the extent of at least 70 percent at or above 2 microns in diameter.

3. A method according to claim 2 in which the catalyst particles after milling are to the extent of at least 60 percent at or above 25 microns in diameter.

4. A method according to claim 1 in which the catalyst particles contain an oxide of copper, manganese or cobalt.

5. A method according to claim 1 in which said catalyst particles would, if in the form of cylinders of length between half and double their diameter, have a porosity in the range of 10–70 percent.

6. A method according to claim 1 in which the catalyst particles contain at least 40 percent of said catalyst for the oxidation of fat.

7. A method according to claim 1 wherein the catalyst particles are to the extent of at least 70 percent at or above 2 microns in diameter, contain at least 15 percent of said catalyst for the oxidation of fat, have a porosity if in the form of cylinders of length between half and double their diameter in the range of 10 to 70 percent, and have a density measured by mercury penetration in the range of 1.4 to 2.5 g/cc; the coating having at least 5 percent of metal or oxide and a porosity of 10 to 40 percent.

8. A method as set forth in claim 1 in which said large hard catalyst particles are cylindrical pellets having crushing strength in the range of 2,000 to 10,000 p.s.i.g. and they are formed by compressing said catalyst for the oxidation of fat.

9. A method as set forth in claim 1 in which the catalyst particles mixed with the enamel binder are a size fraction on average greater than 2 microns.

* * * * *